(12) United States Patent
Zambon

(10) Patent No.: US 7,362,224 B2
(45) Date of Patent: Apr. 22, 2008

(54) THERMALLY SENSITIVE ARRAY DEVICE FOR PRESENCE DETECTION AROUND AUTOMATIC DOORS

(75) Inventor: Alain Zambon, Rue des Muggets (BE)

(73) Assignee: B.E.A. s.a., Angleur (BE)

( * ) Notice: Subject to any disclaimer, the term of this patent is extended or adjusted under 35 U.S.C. 154(b) by 179 days.

(21) Appl. No.: 11/185,382

(22) Filed: Jul. 20, 2005

(65) Prior Publication Data

US 2006/0087430 A1    Apr. 27, 2006

(30) Foreign Application Priority Data

Jul. 22, 2004    (EP)    ................... 04017302

(51) Int. Cl.
*G08B 13/08*    (2006.01)
(52) U.S. Cl. ............... 340/545.3; 340/545.1; 340/545.6; 340/555; 340/556; 340/686.1; 340/686.6; 250/342; 250/349
(58) Field of Classification Search ............ 340/545.6, 340/545.3, 545.1, 555, 556, 686.1, 686.6; 250/342, 349; 187/316
See application file for complete search history.

(56) References Cited

U.S. PATENT DOCUMENTS

| | | | | |
|---|---|---|---|---|
| 4,794,248 A | * | 12/1988 | Gray | .......................... 250/221 |
| 4,864,296 A | | 9/1989 | Trett et al. | |
| 4,888,532 A | * | 12/1989 | Josson | ........................ 318/480 |
| 5,142,152 A | * | 8/1992 | Boiucaner | ................ 250/341.7 |
| 5,291,262 A | | 3/1994 | Dunne | |
| 5,420,430 A | * | 5/1995 | Trett | ........................ 250/341.1 |
| 5,604,580 A | | 2/1997 | Uehara | |
| 5,689,235 A | * | 11/1997 | Sugimoto et al. | ........... 340/541 |
| 5,691,725 A | | 11/1997 | Tanaka | |
| 5,739,523 A | * | 4/1998 | Tsutsumi et al. | ........... 250/221 |
| 5,889,479 A | | 3/1999 | Tabel | |
| 5,949,530 A | | 9/1999 | Wetteborn | |

(Continued)

FOREIGN PATENT DOCUMENTS

DE        102 03 145 C1      4/2003

(Continued)

OTHER PUBLICATIONS

U.S. Appl. No. 11/834,646, filed Aug. 6, 2007, Zambon.

(Continued)

*Primary Examiner*—Hung Nguyen
(74) *Attorney, Agent, or Firm*—Woodling, Krost and Rust

(57) ABSTRACT

The present invention relates to a thermally sensitive array device for detecting a presence of a target object in a surveillance area. The device comprises a plurality of at least two thermally sensitive sensors provided in an array arrangement, each thermally sensitive sensor being associated with one of a corresponding plurality of at least two surveillance spots comprised in the surveillance area. Each thermally sensitive sensor comprises a sensitive element adapted to absorb a portion of thermal infrared radiation emitted from one of said plurality of targets located inside the surveillance cone corresponding to the thermally sensitive sensor. The thermally sensitive sensor can be a thermopile, a bolometer, or any other type. Electronic circuits in each thermally sensitive sensor are adapted to measure a signal generated in the thermally sensitive sensor as a consequence of the temperatures of the target.

26 Claims, 4 Drawing Sheets

U.S. PATENT DOCUMENTS

| | | | |
|---|---|---|---|
| 6,080,981 A * | 6/2000 | Payne | 250/221 |
| 6,160,479 A * | 12/2000 | .ANG.hlen et al. | 340/555 |
| 6,330,523 B1 | 12/2001 | Kacyra | |
| 6,552,345 B2 * | 4/2003 | Asano et al. | 250/342 |
| 7,183,912 B2 * | 2/2007 | Micko | 340/545.3 |
| 2001/0012016 A1 | 8/2001 | Ide et al. | |
| 2002/0008876 A1 | 1/2002 | Terui et al. | |
| 2002/0018198 A1 | 2/2002 | Pierenkemper | |
| 2002/0196424 A1 | 12/2002 | Sano et al. | |
| 2003/0123045 A1 | 7/2003 | Riegl et al. | |
| 2004/0036851 A1 | 2/2004 | Hunter et al. | |
| 2006/0169876 A1 | 8/2006 | Zambon | |

FOREIGN PATENT DOCUMENTS

| | | |
|---|---|---|
| EP | 0 300 663 A2 | 1/1989 |
| EP | 0 710 761 A | 7/1995 |
| EP | 0 689 033 A1 | 12/1995 |
| EP | 1 016 850 A2 | 7/2000 |
| EP | 04 01 7301.5 | 4/2005 |
| EP | 07110717 SR | 8/2007 |
| GB | 2374 228 A | 10/2002 |
| JP | 05060994 | 3/1993 |
| JP | 11 109035 A | 4/1999 |
| JP | 2000028722 | 1/2000 |
| WO | WO 83/01855 | 5/1983 |
| WO | WO 03/019067 A | 3/2003 |

OTHER PUBLICATIONS

Kaisto I et al: "Laser rangefinding techniques in the sensing of 3-D objects" Proceedings of the SPIE—The International Society for Optical Engineering USA, vol. 1260, 1990, pp. 122-133, XP002445596 ISSN: 0277-786X.

* cited by examiner

THERMALLY SENSITIVE ARRAY DEVICE FOR PRESENCE DETECTION AROUND AUTOMATIC DOORS

FIELD OF THE INVENTION

The present invention relates generally to a thermally sensitive array device, comprising, for example, an array of thermopiles, providing presence and motion detection in a surveillance area. The surveillance area comprising an array arrangement of surveillance cones, and an exemplifying application of such a device as a door sensor device is particularly suitable to provide presence and/or motion detection of an object in or near a door threshold, preferably for automatic door applications.

In such applications, the presence of a target object such as a human body is detected for example, when entering the surveillance area of the door sensor for triggering automatic opening of the door, or when the target object is detected in the door threshold for preventing the door from closing on the target object.

Thermal imaging is based on the measurement of thermal radiation emitted by any object having a given temperature. The wavelength associated with this radiation is between 7 µm and 14 µm.

Thermopile sensors can generally be used for non-contact temperature (or thermal) measurement. They can be used or suitably operated to detect the presence of an object having a temperature different from that of its environment. They can also be operated to be insensitive to the environment, when the environment is substantially of a uniform temperature, for example the ambient temperature.

Other techniques are also possible as, for example array of bolometers. All these sensors are called passive because they remotely measure the thermal radiation of the targets without sending any radiation themselves.

Thermopiles are sensors which use a miniaturized thermocouple that is generally constructed between a cold source and a warm source formed by, or on, for example a silicon substrate on which the thermopile is manufactured. Under the assumption that the target is warmer than the ambient temperature of the environment, as is the case of a human or animal body in an environment that is at ambient temperature below their body temperature, the cold source is associated with ambient temperature and the warm source is associated with the target. Thermocouples are placed between the two sources and the temperature difference generates a voltage, which is proportional to the difference of temperature attained by the sources.

BACKGROUND OF THE INVENTION

Thermopiles have been used to evaluate remotely the temperature of zones in several applications as different as ear thermometer (Kenneth et al, U.S. Pat. No. 4,722,612); interior of microwave oven (Bu, U.S. Pat. No. 5,589,094; Lee, U.S. Pat. No. 6,013,907), hair dryer (Van Der Wal et al, WO 99/01726), heating system burner (Carignan, U.S. Pat. No. 4,717,333), and motion detection (Beerwerth et al, U.S. Pat. No. 6,203,194 B1). In the latter case, motion detection is obtained by using a multiple lens technology in order to generate several variations on a sensor array each time the target leaves a zone covered by one lens to enter another one.

Active sensor devices used for presence or motion detection generally rely on the principle that the device comprises an emitter that emits radiation (typically electromagnetic radiation such as light or microwave) in the direction of an area (for example on the ground or there above) or a solid angle in space to be surveyed (herein referred to as a surveillance area) and a radiation detector for detecting a portion of the radiation re-emerging from the surveillance area for example by its reflectivity. The amount of re-emerging radiation varies, when the reflectivity in the direction of the radiation detector is altered. This may occur for example as a consequence of an object entering the surveillance area.

Active sensors generally, and also in applications for automatic doors, have the following disadvantages. Emitting radiation causes an according supplementary power consumption required to maintain the emission of the radiation. The emitted radiation may be detrimental to the well-being or health of humans. When visible, the emitted radiation may also be conspicuous when it is not desirable that presence monitoring is being performed. And the detected amount of radiation reemerging from the surveillance area may be altered by objects other than the target objects to be detected, e.g. human bodies, which may lead to "false alarms".

Passive sensor devices for presence detection do not emit radiation to perform their detection, but rather detect radiation emitted by the target object to be detected. Pyro-electric sensors are well known in applications around automatic doors, but they are being used for movement detection. Pyro-electric sensors are only providing temperature variation measurements, while not being suitable for steady-state temperature measurements.

SUMMARY OF THE INVENTION

In view of these shortcomings of prior art sensors, it is an object of the present invention to provide a sensor device and a door sensor for detecting the presence and/or the motion of a target object, for example human bodies, which is particularly useful for application with and detection around doors, notably automatic doors, and which reduces or obviates the above-mentioned shortcomings. Objects of the present invention are notably to provide a sensor device and a door sensor, which have very low power consumption, which are of a small size, which do not require actively emitting radiation, and which achieve a long-term stability as required preferably for steady-state temperature measurement and monitoring of a surveillance area.

The position of a door sensor would normally be on the top part of a door, either at the centre or aside. In such an application, the door sensor will point to cover or monitor or survey the area of movement of the door. With a view to this application, further objects of the invention are to avoid false alarms or perturbations by the movement of the automatic door, to be insensitive to variations of the reflectivity of the ground or floor in the surveillance area in case of perturbations such as rain, snow, leaves, etc. entering the surveillance area, which may lead to the door opening unnecessarily or staying open unnecessarily long.

According to a first aspect of the present invention, the above objects are achieved by providing a thermally sensitive array device for detecting the presence of an object in a surveillance area, comprising a plurality of at least two thermally sensitive sensors provided in an array arrangement, each thermally sensitive sensor being associated with one of a corresponding plurality of at least two surveillance cones comprised in the surveillance area. Each thermally sensitive sensor is further adapted to absorb a portion of thermal infrared radiation emitted from the corresponding associated one of said plurality of surveillance cones.

Each thermally sensitive sensor further comprises an electronic circuit that is electrically coupled to the sensor for measuring a signal generated in the thermally sensitive sensor by the temperature of a target. The device preferably comprises thermopile sensors or Bolometer sensors as thermally sensitive sensors.

Preferably, the electronic circuit in each thermally sensitive sensor is adapted to output a signal monotonously related to the temperature prevailing in the surveillance cone.

The signal may be a voltage generated by each sensor in the array between first and second contacts of the at least two thermally sensitive sensors.

The device may further comprise pre/amplifying circuitry adapted to measure the plurality of voltages produced by the plurality of thermally sensitive sensors and multiplex circuitry adapted to provide a plurality of varying electrical signals corresponding to the thermally sensitive sensors and indicative of temperatures prevailing in the corresponding surveillance cones.

The device may further comprise a package adapted to accommodate therein said plurality of thermally sensitive sensors, and a plurality of optical elements. Each optical element is adapted to image the portion of infrared radiation emitted from the corresponding surveillance cone onto a first source or sensitive element of the corresponding thermally sensitive sensor. The optical elements may be lenses that are adapted to transmit infrared radiation.

The array arrangement may be a linear array, or a two-dimensional array.

Preferably, at least one sensor element is adapted to be put at variably selectable reference temperature. The purpose of this arrangement is to monitor the detection capacity of the sensor. This feature is helpful for safety applications. For example, each thermally sensitive sensor can be mounted with a heating element which could be used for monitoring the sensitivity of each of the sensor. In a preferable embodiment, the heating function will be performed by the sensor itself through an applied current.

The thermally sensitive array device may further comprise a supplementary sensor adapted to detect the presence and/or the motion of a target object in a supplementary surveillance area. The supplementary sensor is of a different type than the thermally sensitive sensor. The supplementary sensor may be one of a microwave radar sensor, a microwave Doppler sensor, an active infrared sensor, or a pyro-electric sensor.

The plurality of thermally sensitive sensors may be fabricated on a common substrate. The substrate may be a silicon substrate and the thermally sensitive sensors may be fabricated using silicon integration technology, preferably CMOS integration technology.

With a view to applications with automatic doors and door openers, according to another aspect of the invention, there is provided a door sensor device adapted to detect the presence and/or motion of a target object in a surveillance area extending in and/or near a door threshold, wherein the door comprises at least one movable door element adapted to open and close a door opening. The device comprises at least one thermally sensitive array device as described above corresponding to the at least one door element, wherein the plurality of surveillance cones of the at least one thermally sensitive array device are arranged in a linear array arrangement that extends substantially parallel to the corresponding door element.

The surveillance cones may extend on both sides of a corresponding moving door element.

Surveillance spots located on a ground or at any height above the ground are generated by intersection of the surveillance cones of the thermally sensitive sensors. Thus, any target falling inside a detection cone can be detected at any height.

When the door comprises a sliding door arrangement comprising one or more moving door elements adapted to slide in a plane that is substantially parallel to the door opening, the linear array arrangement of surveillance spots of the at least one thermally sensitive array sensor may extend substantially across and along the moving door element or the threshold of the door. In such door arrangement, alternatively, the door sensor device comprises two thermally sensitive array devices, wherein the linear array arrangements of surveillance spots corresponding to the two array device are located on opposite sides of the door threshold.

When the door comprises a swinging door arrangement comprising one or more swinging door elements, at least one thermopile array device may be provided for each swinging door element, wherein the linear arrangements of surveillance spots corresponding to each thermally sensitive array device move with the corresponding swinging door element such that they remain substantially parallel thereto. In such door arrangement, alternatively, the door sensor device comprises two thermally sensitive array devices associated with each swinging door element, the two corresponding linear array arrangement of surveillance spots being located on opposite sides of the swinging door element.

When the door is a revolving door arrangement comprising plural revolving door elements, at least one thermally sensitive array device is provided for each revolving door element, wherein the linear arrangements of the surveillance spots move with the corresponding one of each revolving door elements such that they remain substantially parallel thereto. In such door arrangement, the linear arrangements of surveillance spots are preferably arranged on a side forward in the rotational revolving direction relative to the revolving door element. In such door arrangement, the door sensor device comprises two thermally sensitive array devices for each revolving door element, the two corresponding linear array arrangements of surveillance spots of which are located on opposite sides of the corresponding one of each revolving door element.

The door sensor device may further comprise at least one supplementary sensor adapted to detect the presence and/or motion of an object in at least one supplementary surveillance area, the supplementary sensor being of a different type than a thermally sensitive sensor. Preferably, the supplementary sensor is one of a microwave radar sensor, an active infrared sensor, a microwave Doppler sensor or a pyro-electric sensor.

One fundamental advantage of these thermally sensitive sensors such as thermopile sensors or bolometers over classical pyroelectric sensors is their capability to detect steady state temperature. Pyroelectric sensors are only providing temperature variation measurement. This is advantageous for applications in combination with door openers and/or for automatic doors, because detection of presence of the target is fundamental in this application.

The door sensor device is naturally insensitive to the door elements and/or to the door leaves and guide rails, and can then be set very easily in the door frame. The system is small and lightweight, so it can be easily integrated into a package including not only this type of sensor for safety, but also a further sensor of a different type for motion detection. The dual sensor technology has interesting properties given by the combination of the two technologies.

Further advantages and possible applications of the present invention become apparent from the following detailed description with reference to the exemplifying embodiments illustrated by way of example in the drawings.

In the description, the appended claims, the abstract and in the drawings, use is made of the terms and corresponding reference numerals summarized in the list provided at the end of the description.

DESCRIPTION OF THE INVENTION

Figure 1:
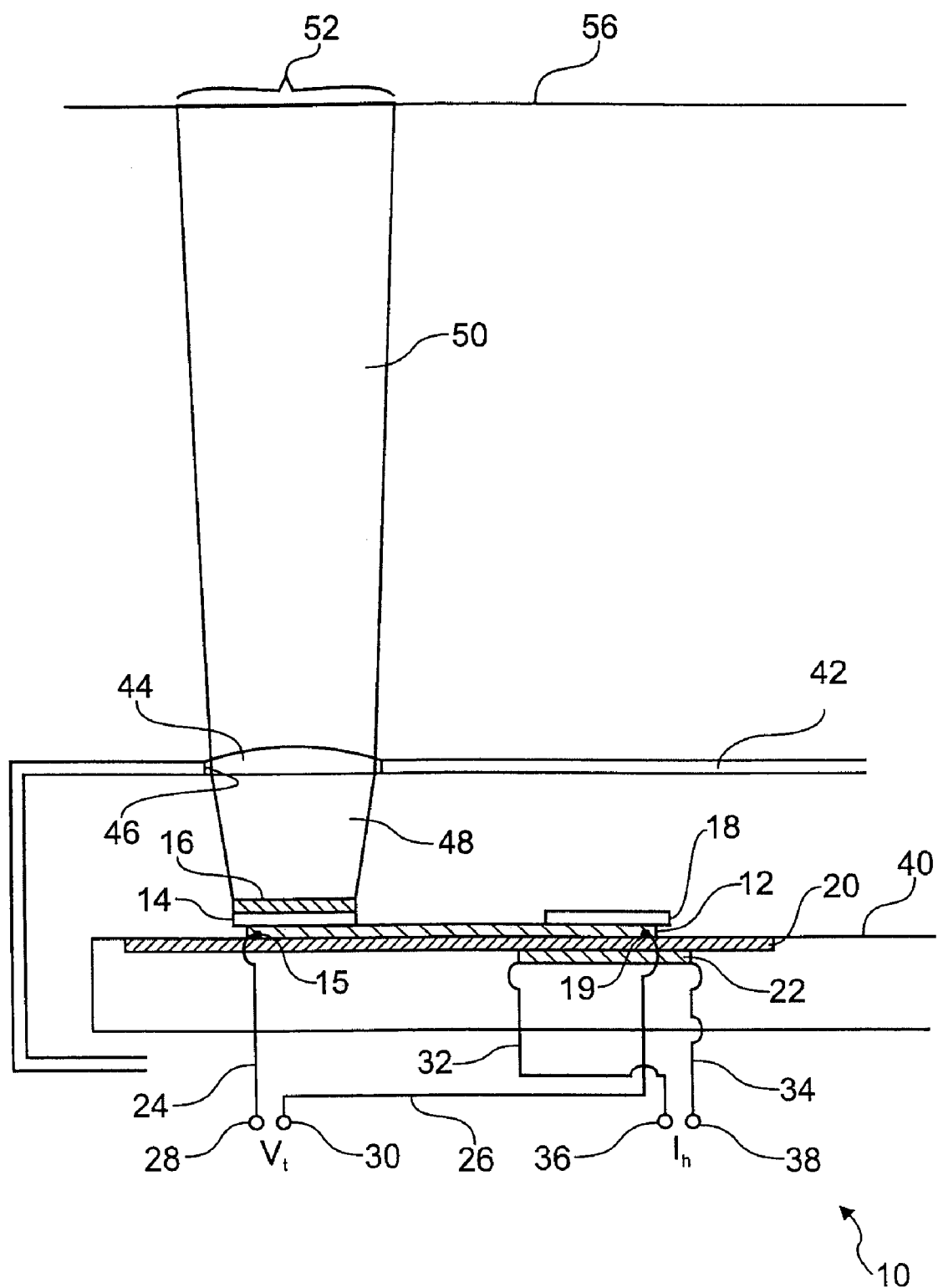
FIG. 1 is a schematic sectional cut through an exemplifying embodiment of a thermally sensitive array device comprising an array of thermopile sensors of an embodiment of an array device according to the present invention.
Figure 2:
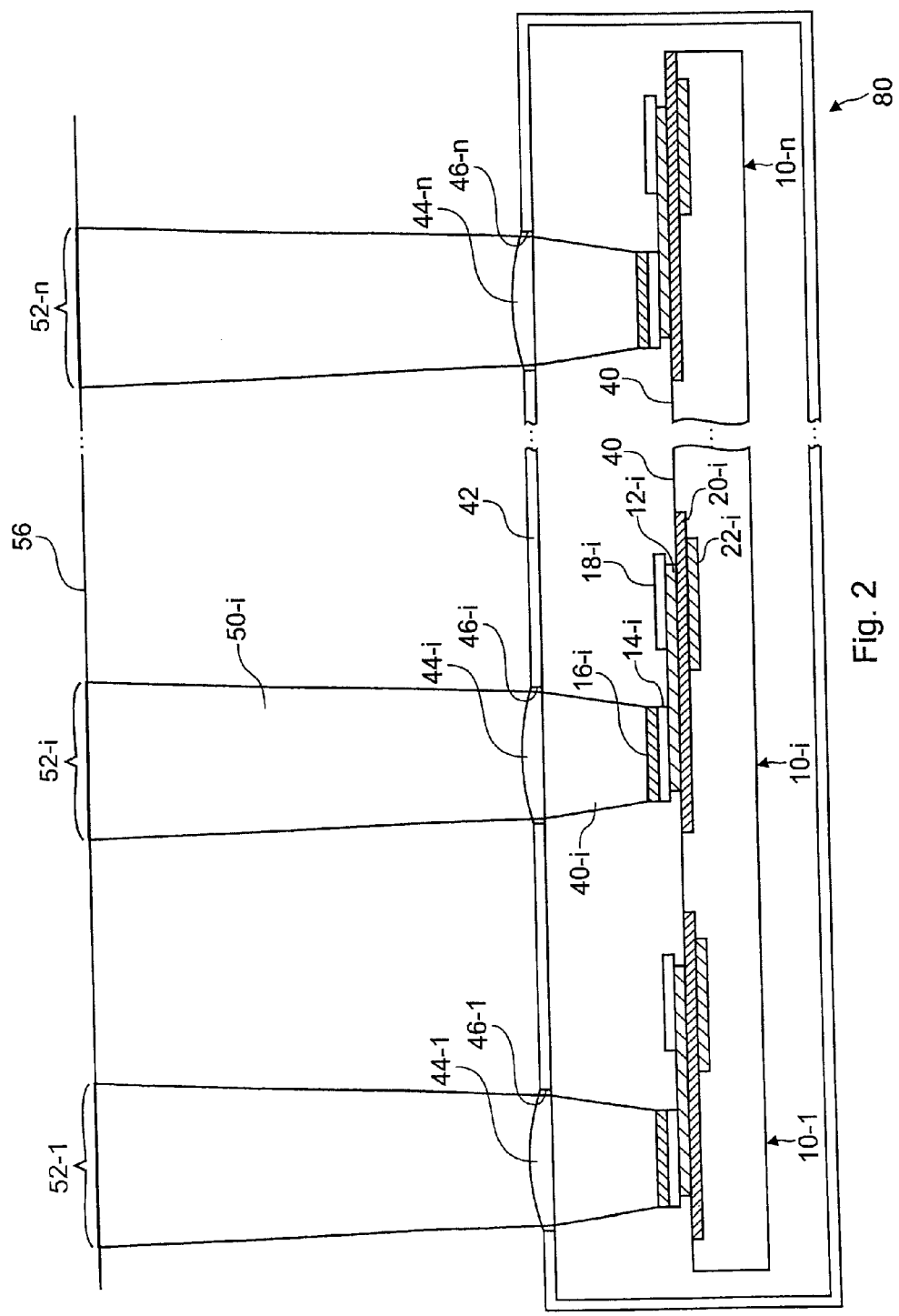
FIG. 2 is a schematic sectional cut through an embodiment of an array of thermopile sensors as shown in FIG. 1 and forming an array device according to the present invention for monitoring a surveillance area comprising surveillance spots.

With reference to FIGS. 1 and 2, a thermopile array device 80 as thermally sensitive device according to the present invention as shown in FIG. 2 basically comprises an array of thermopile sensors 10 illustrated schematically in FIG. 1. Each thermopile sensor 10 is adapted to survey or monitor a surveillance spot 52 making up a portion of the total surveillance area of the device 80.

When referring to an element X of one thermopile sensor shown in FIG. 1 of the array of thermopile sensors shown in FIG. 2, a suffix "-$i$" is concatenated to the reference numeral of this element X to yield the reference numeral X-$i$ of the element in the array. Herein, i is an integer used for labeling a particular thermopile sensor 10-$i$ of the array of sensors, and i may assume any value from 1 to n, where n represents the number of thermopiles comprised in the array.

As shown in FIG. 1, in an embodiment of the present invention, a thermopile sensor 10 comprises a first source element 14 thermally coupled to a first contact 15 of a miniature-sized thermocouple 12 and a second source element 16 thermally coupled to a second contact 19 of the thermocouple 12. The thermocouple 12 is arranged on an isolation layer 20 provided on the surface of a substrate 40. The first contact 15 of the thermocouple 12 is electrically connected to a first thermopile signal port 28 by means of a first thermopile connector 24, and the second contact 19 of the thermocouple 12 is electrically connected to a second thermopile signal port 30 by means of a second thermopile connector 26. An electric signal related to the temperature prevailing in the surveillance area 52 respectively related to the temperature of the first source element 14 of the thermopile sensor 10, viz. a voltage $V_t$ generated between the first and second contacts 15, 19 of the thermocouple 14, is provided or can be measured at, respectively between, the first and second thermopile signal ports 28, 30. As shown in FIG. 2, a plurality of substantially identical thermopile sensors 10-$i$ is provided on substrate 40, which is thus a common substrate. The substrate may preferably be a silicon substrate.

The advance of silicon CMOS integration has allowed integration inside the sensor of the necessary pre-amplifying and multiplexing circuitry, which makes the device according to the invention very attractive for use in low cost applications related for example to automatic doors and door openers. The size of the elements of the array (thermopile sensors) may be relatively large, providing easily a good sensitivity equal or lower than 1° C.

A package or casing 42 is provided around the substrate carrying the array of thermopiles for accommodating therein the array of thermopile sensors 10-$i$.

The thermopile sensor 10 further comprises an electric circuit (not shown) comprising a thermistor (not shown), either as a separate element or preferably included inside the thermopile array substrate 42, and a low noise-low offset amplifier. The thermistor is used to sense the temperature for compensation purpose, and the low noise-low offset amplifier is used to amplify the signals and feed a microcontroller (not shown) comprised in the array device that is preferably also accommodated inside the package 42. Any of the signals from the individual sensors, or processed or derived signals, may be transmitted and provided outside the package 42, for example by respective electric conductors. The output of the array can be a multiplex of all the pixels signals of the sensor, or any combination of output. The information is then transmitted outside the device. The processing of the signals coming from the array may be subject to special processing techniques dedicated to door applications described below.

The thermopile array device 80 may further comprise electronic circuitry including pre-amplifying circuitry (not shown) and multiplexing circuitry (not shown) required to measure the signals (voltages $V_{t-i}$) provided at the thermopile signal ports, for example a voltage provided by a pair of thermopile signal ports. Portions of such electronic circuitry or all electronic circuitry may also be accommodated within the package 42.

In the embodiment shown in FIG. 2, the package 42 comprises a plurality of openings 46-$i$. A plurality of optical element 44-$i$ is provided and arranged within respective openings 46-$i$ of the package 42. Each optical element 44-$i$ images a surveillance spot 52-$i$ onto the first source element 14-$i$ of a thermopile sensor 10-$i$. This means that the optical element transmits a portion of the radiation, in particular the infrared radiation forming the target object beam 50-$i$ of radiation emitted from the surveillance spot 52-$i$ through the optical element 44-$i$, and re-directs or focuses it to become the focused image beam 48-$i$ of radiation, which impinges on the first source element 14-$i$. In that way, associations are obtained between the surveillance spots 52-$i$ and the corresponding associated thermopile sensors 10-I, notably their respective first source elements 14-$i$. The mentioned target object beam 50-$i$ forms a surveillance cone. Inside each cone 50-$i$, the thermal detection can take place and a target can be detected, at any height. The spots 52-$i$ mentioned above are formed by the intersection of the respective cones 50-$i$ with the surveillance area, e.g. the ground.

The infrared radiation (the image beam 48-$i$) impinging on the first source element 14-$i$ is at least partially absorbed therein, and thus heats the first source element 14-$i$ to attain a first temperature that may be higher than a second temperature prevailing at the second source element 18-$i$ of the thermopile sensor 10-$i$. An absorptive layer 16-$i$ is provided on the surface of the first source element 14-$i$ so as to increase its absorptivity for absorbing a greater portion of the infrared radiation impinging thereon.

The optical element 44-$i$ may be made of material that has a high transmissivity so as to provide a pass band for the infrared radiation of interest. The optical element 44-$i$ may be lens, for example made of Germanium or Silicon with appropriate coating, which is transparent for the infrared radiation, and may serve to protect the thermopile sensor 10-$i$.

The array device does not necessarily require a lens or multiple lenses to associate a surveillance spots with sensor elements; other optical means may used, such as waveguides and imaging by a small aperture to guide radiation from a surveillance spot to (the first source element of) a corresponding thermopile element.

The second source electrode 18-$i$ may be protected from being irradiated by radiation emerging from the surveillance area by means of a radiation shield (not shown), so that the temperature of the second source element 18-$i$ is hardly or ideally not influenced by the infrared radiation emerging from the surveillance area. The second temperature is predictably related to the ambient temperature, and can preferably be variably selected or controlled as described below.

As a consequence of the thermal coupling between the first source element 14-$i$ with one end of the thermocouple 12-$i$ (say the first end) and the second source element 18-$i$ with the other end of the thermocouple 12-$i$ (say the second end), the thermocouple 12-$i$ generates a voltage $V_t$ that increases with increasing temperature difference, i.e. difference between the first and the second temperature. The material from which the thermocouple 12-$i$ is made may be selected such that the voltage $V_t$ is substantially proportional to the difference between the first temperature at the first source element 14-$i$ and second temperature at the second source element 18-$i$.

A heating element 22-$i$ is provided near the second source element 18-$i$, in general, with thermally sensitive sensors, preferably under the one of the source element. Preferably, the heating elements (22-$i$) are provided on a side opposite to the side of the surveillance spot (52-$i$) relative to the source elements (18-$i$). More preferably, the heating element is composed of the sensor itself where a current is injected to generate heat.

The heating element 22 is electrically connected to a first heating current port 36 by means of a first heating conductor 32 and to a second heating current port 38 by means of a second heating conductor 34. The first and second heating current ports 36, 38 may be electrically coupled to the electronic multiplexer circuitry. The heating element 22 provides an ohmic resistance that can be powered so that a definable electric current flows there through, which is transformed into heat, which in turn causes heating of the source element 18-$i$ to attain a variably selectable temperature. The resulting change of the temperature of the source element 18-$i$ can be measured. By means of the multiplexing circuitry or any particular circuitry dedicated for the purpose, the powering of the heating element 22 and the heating the source element 18 can be performed repeatedly, and selectively for anyone of the thermopile sensors 10-$i$, so as to provide a convenient possibility to check the detection characteristics of each of the thermocouples 12-$i$ and thermopile sensors 10-$i$ and to check the long-term stability of the detection characteristics so as to provide long-term steady state measurement capability of the device.

Because the signal (voltage) generated by each thermocouple 12-$i$ depends on the temperature difference between the first and second source element, the absolute temperature of the array device as influenced by the ambient temperature or the absolute temperature in the surveillance area does hardly, if not at all, influence signal. Only a change of the temperature prevailing in the surveillance spot caused by a target entering the surveillance spot leads to a change of the infrared radiation emitted there from, and to a corresponding change of the portion impinging on the first source element, which leads in turn to a corresponding change of the first temperature thereof, which will then cause a change in the signal provided by the thermocouple. Or, alternatively, a change of the temperature of the any of the source element, which is variably selectable for example by controlled powering of the heating element provided near this source element, will cause a change in the signal obtained from the thermocouple.

The array of thermopile sensors 10-$i$ may be fabricated on a common substrate 40, for example by using known CMOS integration technology, which allows integration within the package 42 and if desired even within the substrate 40 the required electronic circuitry including the electronic circuits of each thermopile sensor, the pre-amplifying circuit, the powering circuit for powering the heating elements, and the multiplexer circuit. This contributes to making the sensor very small, producible at low-cost and thus attractive for use in low-cost applications related to doors, for example automatic doors and door openers. This also allows providing a plurality of more than one thermally sensitive sensor in a single package to yield a thermally sensitive sensor array device.

Providing at least two sensors in the array allows to perform differential measurement techniques between selected pairs of sensors of the array. Providing even more sensors, for example n sensors, yields an array of sensors. The array may consist of a one-dimensional (or linear) arrangement. The array may also consist of a two-dimensional arrangement, such as a rectangular or square arrangement, for example including a matrix of n×m sensors or pixels, where n and m are integers and represent the number of sensor in the two dimensions of the array. It is clear for the skilled person, that the array of sensors (thermopile elements) can be associated with a corresponding array of surveillance spots in a surveillance area to be monitored, by any of the of means described above for associating a single surveillance spot with a single thermopile sensor.

When a moving target object enters a surveillance area comprising an array of surveillance spots, the sequence of changes of the temperatures prevailing in each surveillance spot can be detected by the corresponding thermopile sensors of the array device. Differential measurement and detection techniques can be applied between selectable pairs of sensor elements, so as to measure for example the temperature difference in a subset of the surveillance spots in which the target is present at a given time with respect to the temperature prevailing in the complementary surveillance spots where the target is not present. This allows detection of the presence of the target irrespective of the ambient temperature, and irrespective of other stationary objects which are at equilibrium with (e.g. are at) the ambient temperature and which are present in the surveillance area. Detection of the change in time of the temperature in the subset of surveillance spots in which the moving target is present allows determining the motion (direction and speed) of the moving target within the array of surveillance spots.

It is also important to note that the array device is totally passive and does not radiate any energy for sensing the surveillance area. This is safer for people, and also reduces drastically the amount of power supply current required to operate the array device. The sensor or array device also requires no illumination and can work in complete darkness while being totally insensitive to illumination variations.

Applications of embodiments of the above described thermopile array device in a door sensor device are described with reference to FIGS. 3 and 4.

The position of a door sensor device would be on the top part of the door, either at the center or aside, so that the device will be oriented so that the array of surveillance area covers the desired area of movement or traffic through and near the door.

Figure 3A:
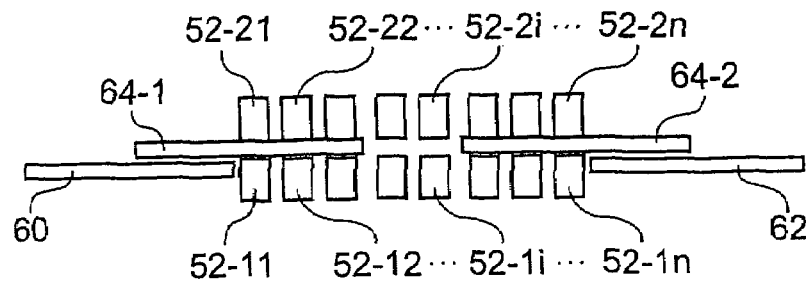
FIG. 3A is a schematic sectional view in a horizontal plane through a sliding door arrangement further comprising a top view onto the plurality of surveillance spots forming the surveillance area of a door sensor device in an embodiment of the present invention.

FIG. 3A shows an application of a door sensor device in a sliding door arrangement. A sliding door 64 comprises a first sliding door element 64-1 and a second sliding door element 64-2, which are adapted to open and close an opening formed in a wall between a first construction wall portion 60 and a second construction wall portion 62. As shown in FIG. 3A, the door sensor system may comprise two arrays of 1×n thermally sensitive sensor elements arranged in linear arrays of thermally sensitive sensors that are substantially parallel to each other on each side of the door. The surveillance spots 52-1*i* of one thermopile sensor array are the intersection between the detection cone of the sensor and the ground, but any target falling inside this detection cone can be detected at any height. These spots are arranged substantially parallel to the door on one side of the construction wall portions 60, 62, while the surveillance spots 52-2*i* of the other thermopile sensor array are arranged parallel to the door on the opposite side of the construction wall portions 60, 62, preferably in opposing register with the surveillance spots 52-1*i*. This arrangement allows detecting the presence or movement of target objects, such persons or animals such as pets, or other objects being at different temperature than the ground moving through the opening. In an embodiment different from that shown in FIG. 3A, it is conceivable to adjust a door sensor device comprising for example a single linear array of thermopile sensors, such that the corresponding surveillance spots are arranged along and near the door threshold.

In contrast to active sensors, assuming that the door elements are at equilibrium or even at the same temperature as the environment including the ground, the door sensor device based on a thermopile array can, by suitable processing of the signals of different thermopile sensors, easily discriminate the door elements 64-1, 64-2, or does not even "see" them. It is then possible to even adjust the sensor to "look through" the door elements and inside the door threshold, and to keep monitoring the surveillance spots even when the door is moving, for example closing. This is a very big advantage, because the door sensor device does not need any information of the position of the door element to correctly detect the presence or movement of a target object, as it will easily discriminate (or simply "ignore") the door element.

Consequently, in a still different embodiment, the sensor device may be adjusted to "look through" the door element, whereby each single surveillance spot extends across, and on both sides of, the door elements 64-1 and 64-2.

In contrast, active infrared sensors as they are generally used in applications related to doors, automatic doors and door openers, derived signals based on a detection of the reflectivity of the target to an infrared beam emitted by the active infrared sensor, for example by a LED, and are sensitive to variations of the reflectivity in the surveillance areas and thus react in case of any perturbations such as rain, snow, wind, leaves, etc. These problems are overcome with the door sensor device based on a thermopile array. The door sensor device according to the present invention will ignore perturbations that are at the same temperature as the environment. If the perturbations are not at the same temperature, it will be understood that such perturbations influence a multitude (or all) thermopile elements (pixels) at the same time and in the same way, which can be recognized by appropriate processing and differential measurement, which then allows to easily distinguish the perturbations from a target object, the presence and/or movement of which is to be detected.

Figure 3B:
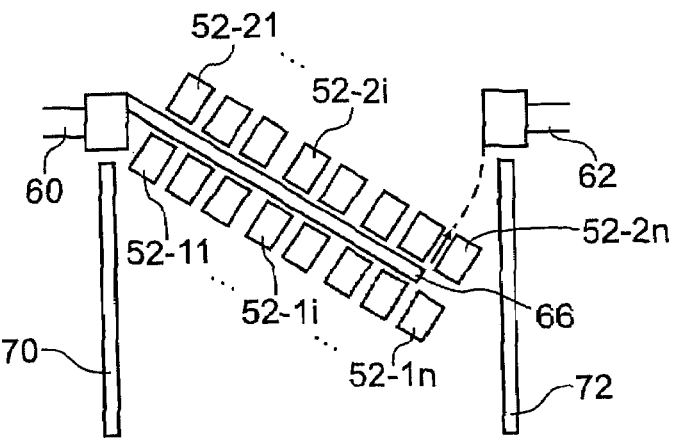
FIG. 3B is a schematic sectional view in a horizontal plane through a swinging door arrangement further comprising a top view onto the plurality of surveillance spots forming the surveillance area of a door sensor device in another embodiment of the present invention.

FIG. 3B shows another application of a door sensor device in a swinging door arrangement. A swinging door 66 is in the known way pivotally fixed to an edge (door frame) of a first construction wall portion 60 and adapted to open and close an opening formed between a second construction wall portion 62 and the first construction wall portion 60. A first guide rail 70 and a second guide rail 72 may be provided to extend perpendicular to the face of respectively the first construction wall portion 60 and the second construction wall portion 62 for guiding targets, notably persons to the opening and over the door threshold. As in the case of the sliding door arrangement shown in FIG. 3A, the door sensor system may comprise two arrays of 1×n thermally sensitive elements that are substantially parallel to each other on each side of the door, so that corresponding first and second subsets of surveillance spots 52-1*i*, 52-2*i* are provided on the ground and/or there at any height, particularly above a predetermined height, and arranged in linear arrays extending parallel to, and preferably in an opposing register relationship, on both sides of the swinging door element 66 as shown in FIG. 3B. Alternatively, a door sensor device may comprise a single linear array of n thermopile elements arranged such that their corresponding surveillance spots form a linear array extending along and near the swinging door element 66.

Figure 3C:
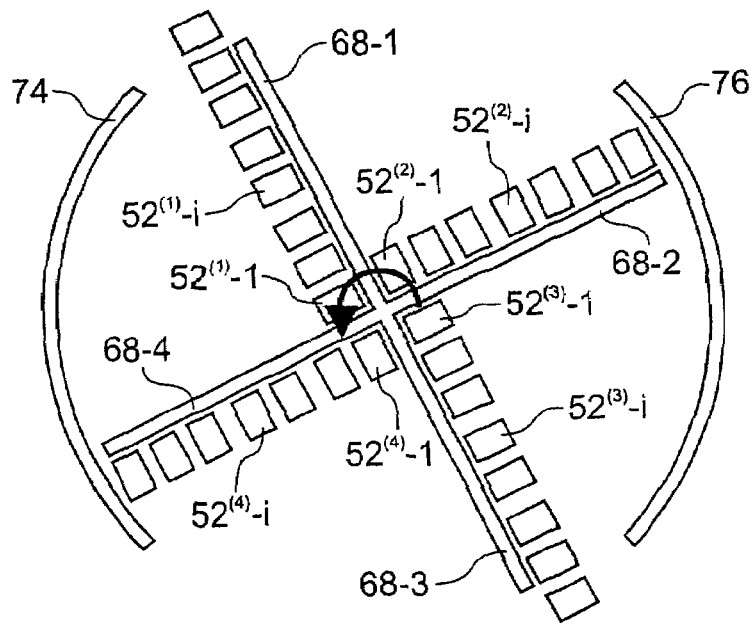
FIG. 3C is a schematic sectional view in a horizontal plane through a revolving door arrangement further comprising a top view onto the plurality of surveillance spots forming the surveillance area of a door sensor device in still another embodiment of the present invention.

FIG. 3C shows still another application of a door sensor device in a revolving door arrangement. A revolving door is arranged between a pair of a first door leave 74 and second door leave 76 and comprises a first, second, third and fourth revolving door element 68-1, 68-2, 68-3 and 68-4 connected to each other along a central vertical axis and capable of pivoting around the vertical axis, for example in the counterclockwise sense indicated by the arrow in FIG. 3C. A door sensor device comprising an array of thermopile elements for each revolving door element 68-1 through 68-4 is provided and arranged such that a corresponding plurality of surveillance spots 58-1*i*, 58-2*i*, 58-3*i* and 58-4*i* extend substantially parallel to the corresponding revolving door elements 68-1, 68-2, 68-3 and 68-4. The arrays of surveillance spots may be located on the ground or there at any height, particularly above a predetermined height, and are preferably arranged on a forward side of each revolving door element in the rotational direction, for providing presence detection as shown in FIG. 3C.

FIG. 4 shows still different embodiments of door sensor devices.

Figure 4A:
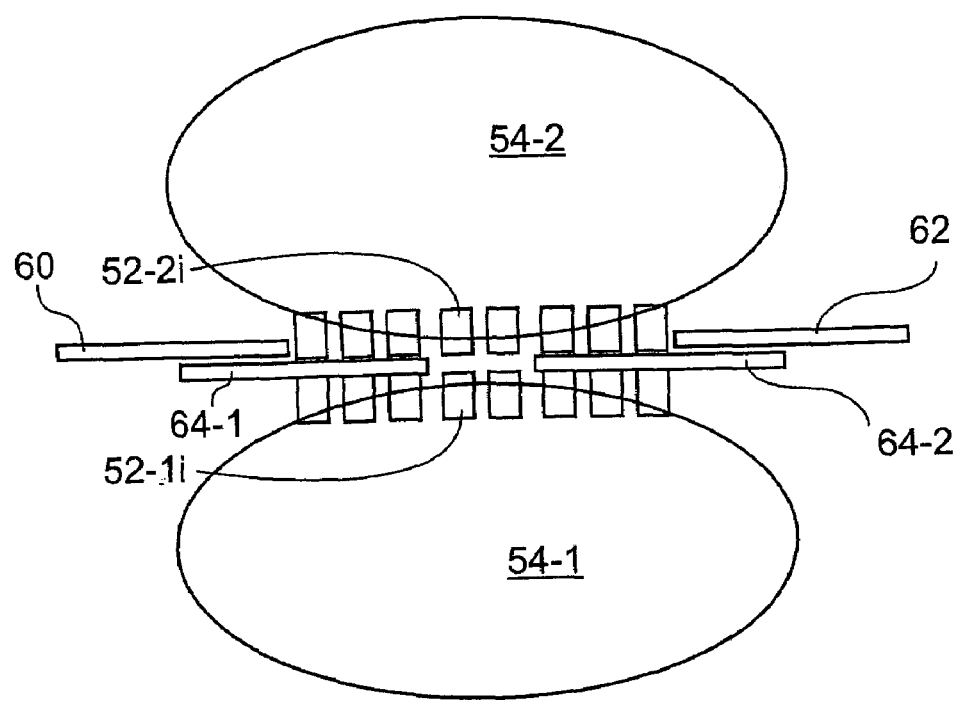
FIG. 4A is a schematic sectional view in a horizontal plane through a sliding door arrangement further comprising a top view onto the plurality of surveillance spots forming the surveillance area of a door sensor device comprising a further sensor of a different type in a preferred embodiment of the present invention.

In FIG. 4A, the door sensor device comprises, in addition to an array of thermopile sensors, at least one supplementary further sensor, or two further sensors, of a different type that is preferably adapted to provide motion detection, at least in a supplementary surveillance spot 54-1 located off and away from the door threshold and/or also in a second supplementary surveillance spot 54-2 on the opposite side of the door threshold. As shown in FIG. 4A, the supplementary surveillance spots may have a substantially elliptic shape. Said supplementary further sensor or sensors may be based in microwave detection, such as a radar and a microwave Doppler radar sensor, or may be a pyroelectric sensor or even an active infrared motion sensor. The further sensor or sensors may be provided in a different casing or in the same casing as the array of thermopile sensors. As shown in FIG. 4A, the thermopile sensors are arranged in a two-dimensional 2×n array with a corresponding plurality of surveillance spots extending parallel to and along the door threshold on both sides of the sliding door elements, in opposing register relationship. Alternatively, the surveillance spots of the thermopile array may form a single linear array with the surveillance spots extending on both sides of the door.

Figure 4B:
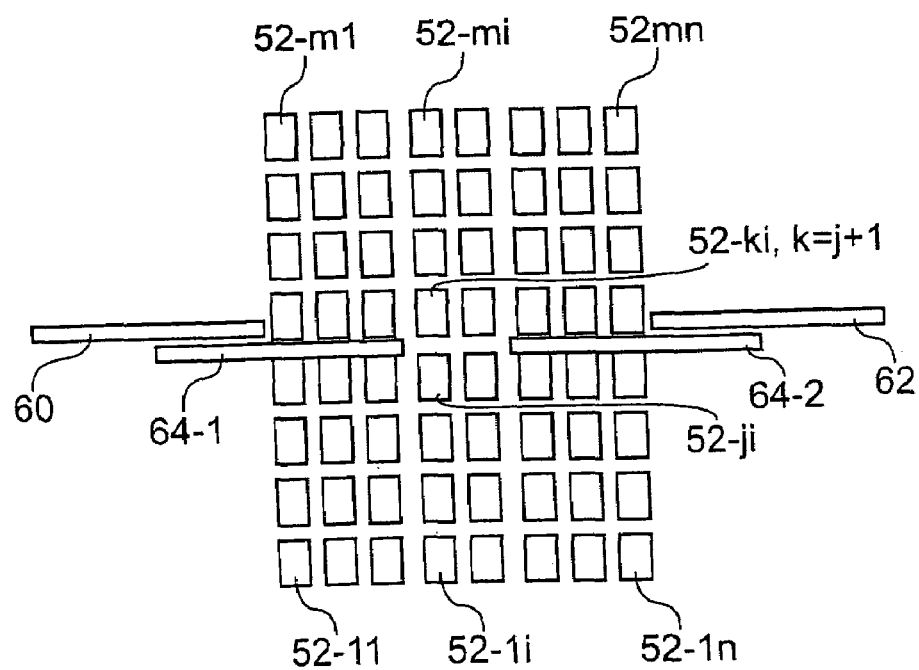
FIG. 4B is a schematic sectional view in a horizontal plane through a sliding door arrangement further comprising a top view onto the plurality of surveillance spots forming the surveillance area of a door sensor device comprising a two-dimensional array of thermopile sensors in still another preferred embodiment of the present invention.

In FIG. 4B, in a still further embodiment, the door sensor device is provided in combination with a sliding door arrangement and comprises a rectangular array of m×n thermopile elements that are associated with corresponding surveillance spots 52-*ji*, where j is an integer that may attain values from 1 to m and i is an integer that may attain values from 1 to n. The surveillance spots 52-*ji* are arranged in m mutually parallel rows (or linear arrays) of n surveillance spots. As shown in FIG. 4B, the door sensor device is adjusted such that two centrally located adjacent arrays 52-*ji* and 52-*ki*, where k=j+1, are arranged parallel to the door element and in an opposing register relationship. The two centrally arranged adjacent arrays of surveillance spots and the corresponding arrays of thermopile sensors are used for presence detection of objects near or in the door threshold. On both sides of the door threshold, a multitude of outer arrays of surveillance spots (three in the embodiment shown in FIG. 4B) is provided on each side of the door and/or the constructions wall, away from the door threshold, for providing presence and/or motion detection.

By applying suitable signal processing, the door sensor devices in the embodiments shown in FIGS. 4A and 4B are capable to detect movement or traffic of objects moving at a distance from the door threshold, even when moving in a direction substantially parallel to the constructions wall elements ("parallel traffic"); they can also be used for example for more selective movement detection or for people counting.

In door applications, the array of thermally sensitive sensors is capable to detect the presence and/or movement of objects on and near the door threshold and even within the door frame, even when a sliding door or a revolving door is closing, because the thermally sensitive sensors do not detect the moving door element as such, when the doors are at the same ambient temperature as the environment comprising the surveillance spots. Beside being insensitive to the moving door elements, the thermally sensitive sensors are also insensitive to guide rails provided for example in sliding or swinging door arrangements and insensitive to door leaves in a revolving door arrangement.

Thermopile array sensors provide long-term stability and steady state measurement capability, which can be verified from time to time upon checking the sensor characteristics, for example individually for each thermopile element by selectively powering corresponding heating elements provided near any of source elements of the thermopile sensors. The heating element can also be the sensor itself where a current is applied.

It is understood that the embodiments described above can be combined and any feature disclosed with respect to one embodiment may also be applied in another embodiment.

REFERENCE NUMERALS LIST

10, 10-*i* thermopile sensor
12, 12-*i* thermocouple
14, 14-*i* first source element
15, 15-I first contact
16, 16-*i* absorptive cover
18, 18-*i* second source element
19, 19-*i* second contact
20, 20-*i* isolation layer
22, 22-*i* heating element
24, 24-*i* first thermopile connector
26, 26-*i* second thermopile connector
28, 28-*i* first thermopile signal port
30, 30-*i* second thermopile signal port
32, 32-*i* first heating conductor
34, 34-*i* second heating conductor
36, 36-*i* first heating current port
38, 38-*i* second heating current port
40 substrate
42 package
44, 44-*i* optical element
46, 46-*i* aperture
48, 48-*i* focused image beam
50, 50-*i* object beam (surveillance cone)
52, 52-*i* surveillance spot (i=1 . . . n)
52-*ji* surveillance spot (j=1 . . . m, i=1 . . . n)
54-1 first supplementary surveillance area portion
54-2 second supplementary surveillance area portion
56 surveillance area
60 first construction wall portion
62 second construction wall portion
64-1 first sliding door element
64-2 second sliding door element
66 swinging door element
68-1, 68-2 first respectively second revolving door element
68-3, 68-4 third respectively fourth revolving door element
70 first guide rail
72 second guide rail
74 first door leave
76 second door leave
80 thermopile array device
Vt, Vt-*i* thermopile voltage
Ih, Ih-*i* heating current

The invention claimed is:

1. A thermally sensitive array of passive infrared sensors for detecting an object around a moveable automatic door, comprising: each of said passive infrared sensors is a thermopile; each of said thermopiles located around said moveable automatic door; said moveable automatic door is adapted to open and close depending on the detection of said object around said moveable automatic door; each of said thermopiles includes at least two thermocouple devices; each of said thermocouple devices includes: a thermocouple having first and second contacts; an isolation layer; said thermocouple engaging said isolation layer; a substrate; said isolation layer engaging said substrate; a first source element and a second source element; an absorptive cover in engagement with said first source element; said first source element and said second source element are thermally coupled to said respective first and second contacts of said thermocouple; and, voltage measuring circuitry affixed to said contacts of said thermocouple.

2. A thermally sensitive array of passive infrared sensors for detecting an object around a moveable automatic door as claimed in claim 1 wherein said substrate is a silicon substrate and said thermocouple includes first and second contacts and wherein said voltage measuring circuitry is interconnected to said first and second contacts of said thermocouple.

3. A thermally sensitive array of passive infrared sensors for detecting an object around a moveable automatic door as claimed in claim 1 further comprising pre-amplifying circuitry interconnected with said voltage measuring circuitry and multiplexing circuitry for communicating voltages measured from each thermocouple.

4. A thermally sensitive array of passive infrared sensors for detecting an object around a moveable automatic door as claimed in claim 1 further comprising a package to house said thermocouples which form said thermopile, a plurality of optical elements, each optical element being adapted to image the portion of infrared radiation emitted from an object onto said first source element of said thermocouple.

5. A thermally sensitive array of passive infrared sensors for detecting an object around a moveable automatic door as claimed in claim 1 wherein the optical elements are lenses adapted to transmit thermal infrared radiation.

6. A thermally sensitive array of passive infrared sensors for detecting an object around a moveable automatic door as claimed in claim 1 wherein said thermocouples are arranged in a linear array.

7. A thermally sensitive array of passive infrared sensors for detecting an object around a moveable door as claimed in claim 1 wherein said array is two-dimensional.

8. A thermally sensitive array of passive infrared sensors for detecting an object around a moveable door as claimed in claim 1 wherein at least one sensor element is adapted to be a variably selectable reference temperature.

9. A thermally sensitive array of passive infrared sensors for detecting an object around a moveable door as claimed in claim 1 wherein each thermocouple includes a heating element, each heating element being near and adapted to heat a sensitive element so as to attain a variably selectable reference temperature used for monitoring said thermocouple performance.

10. A thermally sensitive array of passive infrared sensors for detecting an object around a moveable door as claimed in claim 9 wherein the heating function can be performed by said thermocouple if a current is generated through said thermocouple.

11. A thermally sensitive array of passive infrared sensors for detecting an object around a moveable door as claimed in claim 1, further comprising a supplementary sensor adapted to detect the presence of an object, said supplementary sensor being other than a thermocouple.

12. A thermally sensitive array of passive infrared sensors for detecting an object around a moveable door as claimed in claim 11, wherein said supplementary sensor is selected from the group consisting of a microwave radar sensor, a microwave Doppler sensor, an active infrared sensor and a pyro-electric sensor.

13. A thermally sensitive array of passive infrared sensors for detecting an object around a moveable door as claimed in claim 1, wherein said thermocouples are fabricated on a common substrate.

14. A thermally sensitive array of passive infrared sensors for detecting an object around a moveable door as claimed in claim 13, wherein said substrate is a silicon substrate and the thermally sensitive sensors are fabricated using CMOS integration technology.

15. A thermally sensitive array of passive infrared sensors for detecting an object around a moveable door as claimed in claim 1 adapted to detect the presence and/or motion of said object in a surveillance area extending in and/or near said moveable door, wherein said door includes at least one moveable door element adapted to open and close said door, and, wherein said passive infrared sensors are arranged in a linear array that extends substantially parallel to the corresponding door element.

16. A thermally sensitive array of passive infrared sensors for detecting an object around a moveable door as claimed in claim 15, wherein said array of passive infrared sensors include cones extending on both sides of a corresponding moving door element.

17. A thermally sensitive array of passive infrared sensors for detecting an object around a moveable door as claimed in claim 15, wherein said array of passive infrared sensors generate surveillance spots located on ground level or at any height above ground.

18. A thermally sensitive array of passive infrared sensors for detecting an object around a moveable door as claimed in claim 15, wherein said door comprises a sliding door arrangement comprising one or more moving door elements adapted to slide in a plane that is substantially parallel to said door opening, said linear array of passive infrared sensors create surveillance spots across and along the moving door element or the threshold of said door.

19. A thermally sensitive array of passive infrared sensors for detecting an object around a moveable door as claimed in claim 18 comprising two thermally sensitive arrays wherein said linear arrays are arranged to surveil opposite sides of said door threshold.

20. A thermally sensitive array of passive infrared sensors for detecting an object around a moveable door as claimed in claim 15, wherein said door comprises a swinging door arrangement comprising one or more swinging doors, at least one thermally sensitive array of thermocouples is provided for each swinging door, wherein said thermally sensitive array of thermocouples move with said corresponding swinging door such that each thermally sensitive array of thermocouples remain substantially parallel thereto.

21. A thermally sensitive array of passive infrared sensors for detecting an object around a moveable door as claimed in claim 20, comprising two thermally sensitive arrays associated with each swinging door with a corresponding linear array of surveillance spots located on opposite sides of said swinging door.

22. A thermally sensitive array of passive infrared sensors for detecting an object around a moveable door as claimed in claim 15 wherein said door is a revolving door arrangement comprising plural revolving doors, at least one thermally sensitive array is provided for each revolving door, wherein the linear arrangements of the surveillance spots move with the corresponding revolving door such that they remain substantially parallel thereto.

23. A thermally sensitive array of passive infrared sensors for detecting an object around a moveable door as claimed in claim 22, wherein the linear arrangements of surveillance spots are arranged on a side forward in the rotational revolving direction relative to the revolving door.

24. A thermally sensitive array of passive infrared sensors for detecting an object around a moveable door as claimed in claim 22, comprising two thermally sensitive arrays for each revolving door and two corresponding linear array arrangements of surveillance spots are located on opposite sides of the corresponding revolving door.

25. A thermally sensitive array of passive infrared sensors for detecting an object around a moveable door as claimed in claim 15, further comprising at least one supplementary sensor adapted to detect the presence and/or motion of an object in at least one supplementary surveillance area, said supplementary sensor being different than said thermocouple.

26. A thermally sensitive array of passive infrared sensors for detecting an object around a moveable door as claimed in claim 25, wherein said supplementary sensor is selected from the group consisting of a microwave radar sensor, a microwave Doppler sensor, an active infrared and a pyroelectric sensor.

* * * * *